3,641,225
PROCESS FOR PREPARING CYCLIC PHOSPHOROHALIDITES
James L. Dever, Lewiston, and James J. Hodan, Williamsville, N.Y., assignors to Hooker Chemical Corporation, Niagara Falls, N.Y.
No Drawing. Original application June 29, 1966, Ser. No. 561,329. Divided and this application Jan. 3, 1969, Ser. No. 801,902
Int. Cl. C07d $105/04$; C08f $45/58$
U.S. Cl. 260—976                                   10 Claims

ABSTRACT OF THE DISCLOSURE

A process is described for the preparation of a cyclic phosphorohalidite by reacting a glycol with a phosphorus trichloride or tribromide in the presence of a solvent such as dioxane and tetrahydrofuran. The resulting product is an intermediate in the preparation of fire retardant additives for plastics and resins.

---

This is a division of copending parent application S.N. 561,329 which was filed June 29, 1966 now abandoned.

This invention relates to a novel process for preparing halogenated heterocyclic phosphorus compounds. More particularly, the invention relates to a process for preparing halogenated thiophosphorus compounds of the formula:

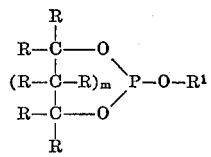

wherein R is independently selected from the group consisting of hydrogen and alkyl radicals of from 1 to 6 carbon atoms, preferably of from 1 to 3 carbon atoms, R′ is selected from the group consisting of haloalkyl radicals of from 1 to 20 carbon atoms, preferably from 1 to 12 carbon atoms, halocyclohexyl and 1-phenyl-2-haloethyl, halo being preferably chlorine or bromine, and $m$ is 0 to 1.

In accordance with the process of this invention, preferably equimolar proportions of a cyclic phosphorohalidite of the formula:

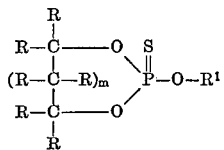

wherein R and $m$ are as previously described and X is halogen, preferably chlorine or bromine, are reacted with an epoxide selected from the group consisting of:

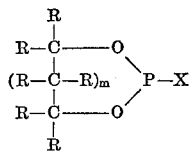

wherein $R^2$ is independently selected from the group consisting of hydrogen and alkyl radicals of 1 to 9 carbon atoms, preferably from 1 to 5 carbon atoms, to yield heterocyclic phosphites characterized by the formula:

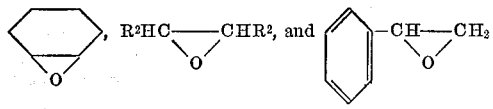

wherein R, $R^1$, and $m$ are as previously described. The halogenated heterocyclic phosphite is thereafter reacted with sulfur to produce a halogenated heterocyclic phosphorothionate of the formula:

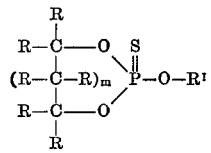

wherein R, $R^1$, and $m$ are as previously described.

Typical examples of the heterocyclic phosphites are 2-(2-chloroethoxy)-1,3,2-dioxaphospholane,
2-(2-chloroethoxy)-1,3,2-diofflaphosphorinane,
2-(2-chloroethoxy)-5,5-dimethyl-1,3,2-phosphorinane,
2-(2-[1-chloro]-propoxy)-1,3,2-dioxaphospholane,
2-(2-[1-chloro]-propoxy)-1,3,2-dioxaphosphorinane,
2-(2-chloroethoxy)-4-methyl-1,3,2-dioxaphospholane,
2-(2-bromoethoxy)-4,4-diethyl-1,3,2-dioxaphospholane,
2-(2-[3-chloro]-butoxy)-4,5,6-trimethyl-1,3,2-dioxaphosphorinane,
2-(2-[3-chloro]-butoxy)-4,4,6-trimethyl-1,3,2-dioxaphospholane and the like.

Typical examples of the heterocyclic phosphorothionates are 2-(2-chloroethoxy)-2-thio-1,3,2-dioxaphospholane,
2-(2-chloroethoxy)-2-thio-1,3,2-dioxaphosphorinane,
2-(2-[1-chloro]-propoxy)-2-thio-4,5-dimethyl-1,3,2-dioxaphospholane,
2-(2-chloroethoxy)-2-thio-5,5-dimethyl-1,3,2-dioxaphosphorinane,
2-(2-[1-chloro]-propoxy)-2-thio-5,5,4-diethyl-1,3,2-dioxaphospholane,
2-(2-[3-chloro]-butoxy)-2-thio-4,4,6-trimethyl-1,3,2-dioxaphosphorinane and the like.

Non-limiting examples of the epoxides which may be used in the practice of the invention are ethylene oxide, propylene oxide, butylene oxide, isobutylene oxide, cyclohexane oxide, 2,3-epoxyhexane, 3-ethyl-2,3-epoxyoctane, styrene oxide, decylene oxide and the like. Non-limiting examples of the phosphorohalidites which may be employed in the process of this invention will be given hereinafter.

The initial reaction mixture of cyclic phosphorohalidite and epoxide may be prepared in any suitable manner, as for example, by means adapted for batch operation. A reaction temperature in the range of from about —25 degrees centigrade to about 25 degrees centigrade, preferably a temperature in the range of from about —10 degrees centigrade to about 15 degrees centigrade, is employed. Since the reaction is exothermic the heat of reaction may be removed by a suitable method such as external cooling or the like in order to maintain the reaction temperature in the ranges mentioned above.

The phosphorohalidite and epoxide are usually employed in equimolar proportions. Thus, one molar proportion of phosphorohalidite is reacted with one molar proportion of the epoxide. However, molar proportions of 0.7:1 to 1.3:1, either reactant being in excess, may be employed. If an excess is used, excess epoxide is preferred.

The process of the invention may be effected in the presence of an unreactive solvent. By "unreactive" is meant that the solvent is unaffected by and stable to the reactants, products and reaction conditions. Examples of such solvents are toluene, xylene and the like.

Upon completion of the reaction, which may take from about 1 to 6 hours, excess epoxide and/or phosphorohalidite is removed by a conventional method, such as distillation at reduced pressure or the like. The halogenated heterocyclic phosphite residue product is then converted to the phosphorothionate utilizing sulfur.

In particular, the halogenated heterocyclic phosphite-containing residue after removal of reactant(s) is raised to and maintained at a temperature in the range of 60 degrees centigrade to 120 degrees centigrade, preferably 70 degrees centigrade to 110 degrees centigrade, and sulfur, in any reactive form, is added thereto. The reaction is generally completed after about 1 to 6 hours. Generally, one molar proportion of sulfur is reacted with one molar proportion of cyclic phosphite. However, molar proportions of 0.7:1 to 1.3:1, either reactant being in excess, may be employed. If an excess is used, excess phosphite is preferred.

The halogenated heterocyclic phosphorothionate may be used without further purification, when equimolar proportions of reactants are employed. When an excess of either reactant is used, a pure product may be obtained by vacuum distillation or other suitable means.

The halogenated heterocyclic phosphorothionates produced by the process of this invention find utility as additive-type flame retardants in plastics and resins, such as urethane foams. Desired fire retardancy is obtained by incorporating 5 to 15 percent of the phosphorothionate into the plastic or resinous material.

The cyclic phosphorohalidites employed in the process of this invention are prepared by reacting a glycol of the formula:

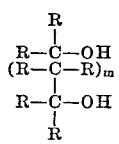

wherein R and $m$ are as previoutly described, with a phosphorus trihalide of the formula:

$$PX_3$$

wherein X is a halogen, preferably chlorine, in the presence of a solvent selected from the group consisting of tetrahydrofuran and dioxane. Typical examples of the phosphorohalidites produced by the process described above are ethylene phosphorochloridite,
ethylene phosphorobromidite,
2-chloro-4-methyl-1,3,2-dioxaphospholane,
2-chloro-4,5-dimethyl-1,3,2-dioxaphospholane,
2-bromo-4-ethyl-1,3,2-dioxaphospholane,
2-bromo-4,4-dimethyl-1,3,2-dioxaphospholane,
2-chloro-4,4,5,5-tetramethyl-1,3,2-dioxaphospholane,
2-chloro-5,5,4-triethyl-1,3,2-dioxaphospholane,
2-chloro-4,4,5-triethyl-1,3,2-dioxaphospholane,
2-chloro-1,3,2-dioxaphosphorinane,
2-chloro-5,5-dimethyl-1,3,2-dioxaphosphorinane,
2-bromo-5,5-dimethyl-1,3,2-dioxaphosphorinane,
2-chloro-5,5-diethyl-dioxaphosphorinane,
2-bromo-4,5,6-trimethyl-1,3,2-dioxaphosphorinane,
2-chloro-5,5-dibutyl-1,3,2-dioxaphosphorinane,
2-chloro-4,4,6-trimethyl-1,3,2-dioxaphosphorinane and the like.

Prior art processes for preparing cyclic phosphorohalidites have included the utilization of an acid acceptor to remove the by-product halogen when a product of sufficient purity and yield was desired. Unexpectedly, the utilization of tetrahydrofuran or dioxane as a solvent in the process for preparing phosphorohalidites eliminates the need for expensive acid acceptors and at the same time provides excellent yields of a product of high purity.

Representative examples of glycols utilized in the process for preparing the phosphorohalidites are 1,2-ethanediol,
1,2-propanediol,
1,2-butanediol,
1,2-pentanediol,
1,2-hexanediol,
2,3-butanediol,
2,3-pentanediol,
2,3-hexanediol,
3,4-hexanediol,
2,3-heptanediol,
2,3-octanediol,
2,3-nonanediol,
1,3-propanediol,
1,3-butanediol,
1,3-pentanediol,
1,3-hexanediol,
2,2-dimethyl-1,3-propanediol,
2-methyl-2-ethyl-1,3-propanediol,
2,2-diethyl-1,3-propanediol,
2-ethyl-2-propyl-1,3-propanediol,
2-amyl-2-propyl-1,3-propanediol,
3-ethyl-2,4-butanediol,
3,3-dimethyl-2,4-butanediol,
3,3-dimethyl-2,4-pentanediol,
5,5-dimethyl-2,4-hexanediol,
3,3,5-trimethyl-2,4-hexanediol,
4-methyl-3,5-heptanediol,
4,4-dimethyl-3,5-heptanediol,
1-phenyl-1,3-propanediol,
1-phenyl-1,3-nonanediol and the like.

The reaction mixture of glycol and phosphorus trihalide may be prepared by suitable means, such as means adapted for batch operation mixing or the like. The reaction temperature is maintained in the range of from −20 degrees centigrade to about 25 degrees centigrade, preferably from about −10 degrees centigrade to 15 degrees centigrade.

The reactants are usually employed in equimolar proportions. Thus, one molar proportion of glycol is reacted with one molar proportion of phosphorus trihalide. A slight excess of either reactant may be employed, preferably a slight excess of phosphorus trihalide. Unexpectedly, it has been found that the utilization of a solvent selected from the group consisting of tetrahydrofuran and dioxane improves the yield of the desired phosphorohalidite and eliminates the need for an acid acceptor. In the practice of the invention, at least one part of special solvent is utilized per part of phosphorus trihalide reacted. Preferably, from about 1.2 to about 3 parts of special solvent are utilized per part of phosphorus trihalide reacted. Generally, the reaction is carried out under atmospheric pressure, without an acid acceptor being present. However, it is also within the scope of this invention to utilize sub-atmospheric and super-atmospheric pressures. The reaction mixture may be worked up in any suitable manner and the solvent is preferably removed from the product by distillation. However, other removal methods, such as evaporation, may be employed. The recovered solvent may be recycled to the reaction, thereby substantially decreasing the cost of operation. In view of yields in the range of 88 to 92 percent and purity greater than 98 percent of desired phosphorohalidite obtained by the process of the invention, separation of the desired phosphorohalidite following removal of solvent is not always required for utilization of the product and in such cases may be omitted. However, if separation is desired, techniques such as distillation, extraction, crystallization or the like, may be employed. As already indicated, the phosphorochloridite possesses utility as a chemical intermediate for the preparation of compounds hereinbefore mentioned.

The following non-limiting examples further illustrate the invention. All parts are by weight and all temperatures are in degrees centigrade, unless otherwise mentioned.

EXAMPLE 1.—PREPARATION OF ETHYLENE-2-CHLOROETHYL PHOSPHOROTHIONATE

A reaction vessel was initially charged with 190 parts of ethylene phosphorochloridite and cooled to a temperature of zero degrees centigrade. To this were added 84 parts of ethylene oxide by distilling it into the flask over 1.1 hours, at a temperature ranging from −10 to +10 degrees centigrade. The mixture was stirred at ambient temperatures for approximately one-half hour more and then concentrated at 50 degrees centigrade and 8.0 millimeters of mercury absolute pressure to remove excess ethylene oxide. The residue was warmed to 80 degrees centigrade and then 48 parts of sulfur were added in several portions over a period of 0.6 hour at 80–95 degrees centigrade. Following the addition of the last portion of sulfur, the temperature was allowed to reach about 128 degrees centigrade, whereupon cooling was applied and the temperature was reduced to 110 degrees centigrade. After stirring for a half hour and gradually warming to 130 degrees centigrade, the residue 306 parts (100% conversion), was ethylene-2-chloroethyl phosphorothionate of greater purity than 98 percent by nuclear magnetic resonance and infrared. The index of refraction was $N_D^{25}$ 1.5160. The product was found to contain 17.6 percent chlorine, 15.1 percent phosphorus and 16 percent sulfur. The calculated percentages of these elements in $C_4H_8O_3PSCl$ are chlorine 17.5 percent, phosphorus 15.3 percent, and sulfur 15.8 percent. The product was ethylene-2-chloroethyl phosphorothionate.

Upon replacement of ethylene phosphorochloridite of Example 1 with an equimolar proportion of a compound such as 2-chloro-4-methyl-1,3,2-dioxaphospholane,
2-bromo-4,4-dimethyl-1,3,2-dioxaphospholane,
2-chloro-5,5,4-triethyl-1,3,2-dioxaphospholane,
2-chloro-1,3,2-dioxaphosphorinane,
2-chloro-5,5-dimethyl-1,3,2-dioxaphosphorinane,
2-bromo-5,5-diethyl-1,3,2-dioxaphosphorinane,
2-chloro-5,5-dibutyl-1,3,2-dioxaphosphorinane or the like, the corresponding halogenated heterocyclic phosphorothionate is formed.

When ethylene oxide in Example 1 is replaced with an equimolar proportion of a compound such as propylene oxide, butylene oxide, isobutylene oxide, cyclohexane oxide, 2,3-epoxyhexane, 3-ethyl-2,3-epoxyoctane, styrene oxide, decylene oxide or the like, the corresponding halogenated heterocyclic phosphorothionate is formed.

In a like manner, any one of the mentioned phosphorochloridites, reacted with any one of the mentioned epoxides, produces halogenated heterocyclic phosphorothionates.

EXAMPLE 2.—PREPARATION OF 2-CHLORO-1,3,2-DIOXAPHOSPHOLANE

A reaction flask was charged with 824 parts (6.0 moles) of phosphorus trichloride and 1,035 parts of dioxane. This was immersed in a bath regulated at a temperature of −10 to −5 degrees centigrade and to this mixture were added 352 parts of ethylene glycol over 1.75 hours while temperature of reaction was maintained in the range indicated. After stirring for 15 minutes, the mixture was allowed to warm to 10 degrees centigrade and the solvent was stripped using a 10 sieve-plate column, a magnetic head, and a trap maintained at −10 degrees centigrade to collect solvent. The mixture was stirred at 200 millimeters of mercury pressure absolute for 0.5 hour to remove most of the hydrogen chloride and the solvent was removed in three parts: (1) boiling point 21 degrees centigrade (pot temperature to 40 degrees centigrade) at a pressure of 50–30 millimeters of mercury absolute, the yield was 495 parts; (2) boiling point 20–25 degrees centigrade (pot temperature to 55 degrees centigrade) at a pressure of 25 millimeters of mercury absolute, the yield was 422 parts; (3) boiling point 22–52 degrees centigrade (pot temperature of 64 degrees centigrade) at a pressure of 25 millimeters of mercury absolute, the yield was 73 parts. At this point, the residue weighed 732 grams (96.5 percent conversion based on residue product). The solvent recovery was 97 percent. Distillation of a portion comprising 505 parts yielded 462 parts of colorless product having a boiling point of 52.5–58 degrees centigrade at 19 millimeters of mercury absolute pressure, and $N_D^{25}$ 1.4882. The product was 2-chloro-1,3,2-dioxaphospholane of 98 percent purity. The conversion was 88.5 percent. When the recovered solvent was used in a second cycle of the reaction, the conversion, based on distilled product, was 92.5 percent and the solvent recovery was 97 percent.

Upon replacement of ethylene glycol in Example 2 with an equimolar proportion of a compound such as 1,2-propanediol, 1,2-butanediol, 1,2-pentanediol, 1,2-hexanediol, 2,3-butanediol, 1,3-propanediol, 2,2-dimethyl-1,3-propanediol, 2-methyl-2-ethyl-1,3-propanediol, 2,2-diethyl-1,3-propanediol, 3,3 - dimethyl-2,4-pentanediol, 5,5-dimethyl-2,4-hexanediol, 1-phenyl-1,3-propanediol or the like, the corresponding cyclic phosphorochloridite is produced.

When dioxane of Example 2 is replaced with tetrahydofuran similar results are obtained.

From the foregoing description and examples, it will be apparent to those skilled in the art that various modifications are possible without departing from the scope of the invention and, therefore, said description and examples are not to be construed as limiting the invention except as defined by the appended claims.

What is claimed is:

1. A process for preparing a phosphorohalidite of the formula:

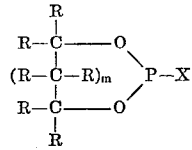

wherein R is independently selected from the group consisting of hydrogen and alkyl radicals of from 1 to 6 carbons, X is halogen independently selected from the group consisting of chlorine and bromine and m is 0 to 1, comprising reacting a glycol of the formula:

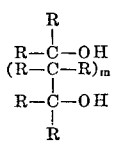

wherein R and m are as previously described, with a phosphorus trihalide of the formula

wherein X is as previously described, in the presence of a solvent selected from the group consisting of dioxane and tetrahydrofuran.

2. A process in accordance with claim 1, wherein the reaction temperature is maintained in the range of −20 degrees centigrade to 25 degrees centigrade.

3. A process in accordance with claim 1, wherein the glycol is ethylene glycol.

4. A process in accordance with claim 2, wherein the glycol is 2,2-dimethyl-1,3-propanediol.

5. A process in accordance with claim 3, wherein the solvent is dioxane.

6. The process in accordance with claim 1, wherein R is alkyl of from 1 to 3 carbon atoms.

7. The process of claim 1 wherein R is methyl.

8. The process of claim 1 wherein R is ethyl.

9. The process of claim 1 wherein R is butyl.

10. The process of claim 1 wherein X is chlorine.

References Cited

UNITED STATES PATENTS 2,927,122  3/1960  Schrader _____ 260—976 X

CHARLES B. PARKER, Primary Examiner

A. H. SUTTO, Assistant Examiner

U.S. Cl. X.R.

260—2.5 AJ, 45.7 PS, 45.95, 937, 977, 985